Figures 1, 2:
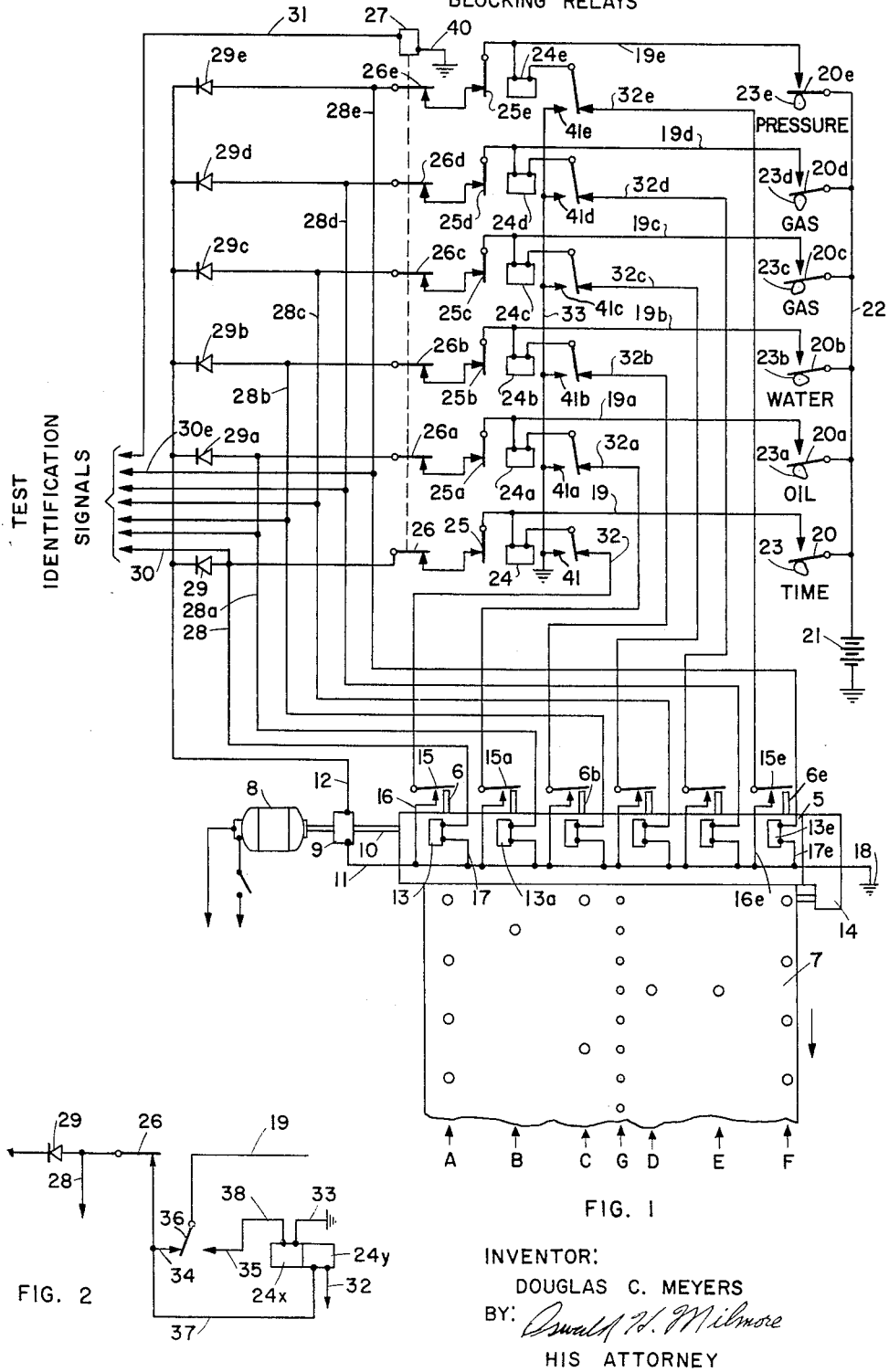

Nov. 22, 1960     D. C. MEYERS     2,961,286

MULTI-CHANNEL RECORDING SYSTEM

Filed Oct. 17, 1958

INVENTOR:
DOUGLAS C. MEYERS
BY: Oswald W. Milmore
HIS ATTORNEY

United States Patent Office 2,961,286
Patented Nov. 22, 1960

2,961,286

MULTI-CHANNEL RECORDING SYSTEM

Douglas C. Meyers, Metairie, La., assignor to Shell Oil Company, New York, N.Y., a corporation of Delaware Filed Oct. 17, 1958, Ser. No. 767,826

3 Claims. (Cl. 346—50)

The invention relates to the preparation of multi-channel records, wherein a series of electrical input circuits are connected to individual code solenoids on the recording machine to transmit electrical signals occurring randomly as to time for making sensible marks in allocated channels of the record, such as tape. Such multi-channel tape recording systems are useful for recording, in isochronistic relation, different elements of data produced by separate data-producing means, such as monotonic data, e.g., the passage of time, the measurement of fluid or electrical current flow, or the counting of objects or events, or fluctuating data, such as those representing temperature and pressure.

The invention is particularly applicable to logging systems and will be described as applied to the automatic logging of test data on oil wells; however, the invention is not limited to this application. In the preferred embodiment it is used to prepare machine-sensitive records, particularly punched tapes.

In my prior application, Serial No. 667,573, filed June 24, 1957, there are described two embodiments of a device for recording such separate items of data in allocated tape channels by connecting the code solenoids (also called magnets) of the tape punching machine through blocking and pulse-limiting relays to individual data-originating devices which emit electrical pulses having durations exceeding the operating cycle period of the punching machine. In both one of the channels is allocated to recording time signals which are emitted from a timer at equally spaced intervals; in one embodiment the machine is operated to punch only when a time signal is received, thereby the tape advances a fixed distance for each time interval, while in the other punching is effected each time a signal is received in any of the input circuits, so that the tape movement is random with respect to time. In such circuits the pulse-limiting relays transmit the pulses for only short times, less than the cycle time of the punching machine, and thereafter maintain the input circuit disconnected from the code solenoids until the electrical signal ceases; thereby each signal pulse causes only a single hole to be pulsed although the pulse has a duration in excess of the cycle time.

However, the circuits described in the above patent application for the second embodiment permit occasional pulses to be lost; thus, it is estimated that in one typical installation one pulse in about 3,000 is lost and would become more frequent with increased pulsing rate. Such loss occurs when the pulse commences just after the start of the operating cycle of the punching machine (too late to arm the corresponding punch) but soon enough to operate the pulse-limiting relay.

It is an object of the invention to provide an improved multi-channel tape recording system wherein such loss of pulses is obviated.

A further object is to provide a simple and inexpensive arrangement for insuring that one and only one hole will be punched into the tape for each electrical impulse in any input circuit, which is foolproof and uses a minimum of circuit elements or components.

In summary, each input circuit is connected to the corresponding code solenoid through a normally-closed switch of a blocking relay the solenoid of which is energized from the input circuit and further connected to a punch-controlled switch so as to operate the relay when the corresponding punch is moved; the relay solenoid further has a holding circuit arranged to hold it in operated condition so long as power is applied to the input circuit.

The electrical pulses applied to the input circuit have longer durations than the operating cycle time of the punching machine. With the machine initially idle, the pulse is transmitted immediately to the code solenoid to arm the punch and the blocking relay operates as soon as the punch movement operates the punch-controlled switch and is locked by its holding circuit, so that the punch cannot be again armed by the same pulse to cause punching on a subsequent cycle. When a pulse arrives while the machine is in operation and too late to arm the punch, the blocking relay does not operate during that cycle and the pulse arms the punch during the next cycle; the blocking relay then operates as previously described.

The invention will be described further with reference to the accompanying drawings forming a part of this specification and showing certain preferred embodiments by way of illustration, wherein:

Figure 1 is a diagrammatic view of a tape-punching machine and associated circuit elements according to the invention; and Figure 2 is a diagrammatic view of an alternative arrangement of the blocking relay.

Referring to Figure 1, there is shown a punching machine 5 (also known as a motorized punch) of any suitable type having a plurality of normally retracted punches 6–6e, there being one such punch for each longitudinal channel on a paper tape 7, e.g., six as shown, although any number of channels may be used. Various machines may be used in the system; because they are well known they are not described in detail. In general, such a machine includes a continuously operating electric motor 8 the output shaft of which is coupled through a magnetically operated, single-revolution clutch 9 to an operating shaft 10 having mechanical means, not shown, for operating the punches to perforate the tape. The clutch is normally disengaged; when an electrical pulse of sufficient duration to operate the clutch, e.g., 15 milliseconds, but less than the cycle time of the shaft, e.g., 20–100 milliseconds, is applied to its winding via a ground circuit 11 and a control circuit 12, the clutch is engaged to rotate the operating shaft through one revolution and is thereafter disengaged. Each punch has a separate control or arming device (not shown) having a latch which normally locks or inactivates the punch to disengage it operationally from the shaft and prevent depression of the punch. Each arming device includes a separate clutch solenoid 13–13e, also known as a code magnet, which when electrically energized for a control period like that described above for the clutch, releases the corresponding punch latch and thereby arms the punch to be depressed by the operating shaft during the next revolution of the shaft. The code solenoids may be energized simultaneously with the clutch to cause punching during the same cycle; however, if energized after the start of the cycle or too late during the cycle they are ineffective to cause punching during that or the subsequent cycle unless the applied pulse persists beyond the current cycle. In one commercially available punching machine the latter is effected by a mechanical interlock which prevents the arming of the code solenoids approximately 25° of the operating shaft rotation before the armed punches are engaged to punch the tape. The mechanical lock is released and all pins are re-latched immediately following the withdrawal of the punches from the tape. If the pulse applied to the code solenoid were of sufficient duration to continue beyond the end of the cycle the punch would be re-armed immediately to cause punching during the subsequent cycle; it is, therefore, necessary to limit the duration of the applied pulse.

The machine further includes a tape-advancing mechanism, represented diagrammatically at 14, which advances the tape 7 step-wise following each punching operation, after the punches have been retracted from the tape; it may be operated electrically or mechanically from the operating shaft 10 by means not shown.

Each punch 6–6e has associated therewith a normally open, punch-controlled switch 15–15e, including a stationary contact and a spring contact which is mechanically coupled to the punch (or to the punch arming latch or other mechanical part that moves whenever the punch moves, either simultaneously or just prior to it) so as to close the contacts when the punch is armed and advances from its normal, retracted position, and to open the contacts when the punch is retracted. Each of the stationary contacts of these switches is connected by a circuit 16–16e to the ground circuit 11. Similarly, one terminal of each of the code solenoids is connected by a circuit 17–17e to the ground circuit 11. Ground for these circuits is provided at 18. It will be understood that although a common ground return is shown for simplicity, this is not restrictive of the invention.

The system is controlled by a series of input circuits 19–19e, to which electrical pulses are applied by separate pulse generators 20–20e, two or more of which operate independently of one another as regards time. By way of illustration, the pulse generators may be normally open electrical switches connected to a source 21 of electrical potential by a circuit 22 and actuated by cams 23–23e, which may be fixed on the output shafts of meters or counters, so as to close the respective switches and transmit one or more pulses at each revolution (in accordance to the number of cam lobes) and so indicate the flow of a unit of fluid or the occurrence of some event. As applied, for example, to automatic oil well logging, the input circuit 19 may transmit time pulses, such as one pulse every thirty-six seconds, and the other five may indicate the flow of oil, water, two types of gas, and pressure, respectively, measured as described in the above-mentioned prior patent application. The cams 23–23e rotate at speeds sufficiently low that the duration of each pulse exceeds the cycle time of the operating shaft 10, usually longer than one-tenth of a second; this restricts the repetition rate.

Each input circuit is connected to one terminal of the magnet winding 24–24e of a blocking relay having, in this embodiment, two normally closed and one normally open switches. These relays are fast-acting. Each input circuit is further connected via the normally closed switch 25–25e of the respective blocking relay through a separate pair of normally closed switch contacts of an isolating relay having a magnet winding 27 and via connecting circuits 28–28e to individual code solenoids 13–13e. Each of the connecting circuits 28–28e is also connected through a rectifying diode 29–29e to the circuit 12 so as to energize the clutch winding whenever any of the said connecting circuits is energized while preventing spurious application of energy to other connecting circuits.

For punching test-identification information the code solenoids are further connected via the connecting circuits and circuits 30–30e to a pulse emitter (not shown) which emits in each circuit a series of pulses, which may be coded in any desired form. Different items of the test-identification information may, for example, be allocated to specific tape channels, so that each of the circuits 30–30e carries a series of pulses pertaining to one such item and the number of pulses in each channel indicates the information. By way of example, these items of information may include the choke used in the well, the lease number, the well number, and the day of the month. During this test-identification period a continuous electrical signal is applied to the circuit 31, which is connected to one terminal of the winding 27; the other terminal is grounded as shown at 40. While test information is being recorded it is necessary to isolate the code solenoids from the input circuits 19–19e and this is effected by operation of the isolation relay when the winding 27 is energized. When this relay is normal no pulses are transmitted through the circuits 30–30e.

Returning to the blocking relays, the other terminal of each magnet winding 24–24e is connected through the second normally closed switch thereof to a control circuit 32–32e to the movable spring contact of the corresponding punch-controlled switch 15–15e. Each said terminal is further connected through the normally open switch 41–41e of the respective relay to a ground circuit 33. In the specific embodiment shown the normally closed and normally open switches have a common movable spring contact, but this is not restrictive of the invention. It is desirable that these switches be of the make-before-break type and/or that the relay armature have sufficient momentum to insure closing of the normally open switches.

Operation

During the test-identification period a continuing potential applied to circuit 31 maintains the isolating relay winding 27 energized and the switches 26–26e open. Identification pulses of short duration, e.g., 15–15 milliseconds, are transmitted to the circuits 30–30e. These are transmitted via connecting circuits 28–28e to be corresponding code solenoids 13–13e to arm the corresponding punches; simultaneously, pulses are transmitted through the diodes 29–29e and circuit 12 to the winding of clutch 9 to cause the motor 8 to rotate the operating shaft through one revolution and effect a punching stroke of the armed punches. When the punches are retracted from the tape the mechanism 14 advances the tape one step. A small hole G is punched into the tape by the machine at each step for facilitating the tape advance. In this operation the pulses in the several circuits 30–30e are of short durations and are transmitted simultaneously and at time intervals to obviate the danger of making two punches for each pulse or of losing a punch; hence the blocking relays are not necessary and they play no role in this phase, which may last for one or several seconds.

The test period proper may commence immediately after the test-identification period and may endure for several hours. The circuit 31 being de-energized, the switches 26–26e are closed. When one or more of the input circuits are energized, the electrical pulse is transmitted through the closed switch 25–25e of the respective blocking relay and the respective connecting circuit to the code solenoid to arm the punch associated therewith. Simultaneously the winding of the clutch 9 is energized through the circuit 12 and one or more of the diodes 29–29e to cause one revolution of the operating shaft 10, punching, and tape-advance as described above. The arming of the punch (or movement thereof) closes the associated switch 15–15e, thereby completing to ground the corresponding circuit 32–32e and thence through the normally closed switch of the blocking relay to operate it from power derived from the input circuit. The relay is then locked through the make contact 41–41e and the ground circuit 33 and is held in operate condition until the signal on the input circuit terminates.

It is evident that the appropriate blocking relay operates to open its respective switch 25–25e before completion of the operating cycle of the punching machine, thereby limiting the duration of the pulse applied to the code solenoid and preventing the same pulse from arming the punch for a second time. Each pulse will, therefore, cause only a single hole to be punched in the corresponding tape channel, identified at A–F.

When a pulse commences during the operating cycle of the machine, too late to arm the punch, the corresponding normally open, punch-controlled switch 15–15e will not close; hence the corresponding blocking relay will not operate and the pulse continues to be applied to the code solenoid so as to cause punching during the subsequent cycle. In this manner the loss of a pulse is prevented.

According to a variant of the blocking relay, shown in Figure 2, the blocking relay is provided with two windings 24x and 24y and the relay controls only two switches, viz., one normally closed switch 34 and one normally open switch 35, which may have a common spring contact 36 which is connected to the respective input circuit, such as the circuit 19. The stationary contact of the normally closed switch 34 is connected through the isolating relay switch 26 to the connecting circuit 28 and diode 29, and also via a circuit 37 to one terminal of the winding 24y; the other terminal of this winding is connected to the circuit 32. The stationary contact 35 of the normally open switch is connected by a circuit 38 to one terminal of the winding 24x; the other terminal of this winding is connected to the grounded circuit 33. It is understood that the parts 28, 29, 32 and 33 are further connected as described for Figure 1.

Operation of the embodiment of Figure 2 is functionally the same as described for Figure 1. A pulse applied to the input circuit 19 is transmitted through the normally closed contact 34 to the code solenoid and to the clutch magnet through the connecting circuit 28 and diode 29, respectively. It is also applied via circuit 37 to the relay winding 24y but this circuit is completed through the circuit 32 only when the corresponding punch is armed. The relay then operates to open the switch at 34 and to lock the relay through the winding 24x until the signal in the input circuit is terminated.

I claim as my invention:

1. A multi-channel punched tape recording system comprising: a tape-punching machine including a plurality of punches for punching holes in a corresponding plurality of channels on a tape, a separate code relay having a normally open contact for arming each punch and operating means for operating those punches which are armed by their corresponding code relays; a separate blocking relay for each code relay having a first normally closed contact and a two position switch having a second normally closed contact and an open contact, said open contact being grounded, a separate input circuit for each code relay, each of said input circuits being connected to the solenoid of one of said code relays through the first normally closed contact of one of said blocking relays to operate said code relay to close the normally open contact thereof; said normally open contact of the code relay being disposed to connect the second closed contact of the blocking relay to ground; the solenoid of each of said blocking relays being coupled to one of the separate input circuits and to the movable element of the two position switch whereby an input signal will operate said code relay and both said blocking relays to open said first closed contact to prevent the transmission of additional input pulses to said code relay until the operating means has completed its cycle of operating the armed punches.

2. In a multi-channel punched tape recording system, the combination of: a tape-punching machine which includes a plurality of punches for punching holes in a corresponding plurality of channels in a tape, a separate code solenoid for arming each punch, and operating means for operating those punches which are armed by the corresponding solenoids; an individual electrical punch-controlled switch for each punch responsive to the operation thereof; a separate electrical input circuit for each said code solenoid; and a separate blocking switch interposed between each said input circuit and the corresponding code solenoid, each of said blocking switches having two normally closed and one normally open switches and an operating solenoid, one of said normally closed switches being connected serially between the input circuit and the code solenoid; said input circuit having two parallel branches connected through said operating solenoid, one branch being completed through the other normally closed switch and the punch-controlled switch and the other branch through the normally open switch to permit operation of the blocking switch through the one branch only when the punch controlled switch is closed upon operation of its punch and holding the blocking switch operated through the other branch so long as an electrical signal continues in the input circuit.

3. In a multi-channel punched tape recording system, the combination of: a tape-punching machine which includes a plurality of punches for punching holes in a corresponding plurality of channels in a tape, a separate code solenoid for arming each punch, and operating means for operating those punches which are armed by the corresponding solenoids; an individual electrical punch-controlled switch for each punch responsive to the operation thereof; a separate electrical input circuit for each said code solenoid; and a separate blocking switch interposed between each said input circuit and the corresponding code solenoid, each of said blocking switches having an operating solenoid with two windings, at least one normally closed switch and a normally open switch, said normally closed switch being connected serially between the input circuit and the code solenoid, one winding of the operating solenoid being connected serially in a control circuit from said input circuit which includes the normally closed switch and said punch-controlled switch and the other of said windings being connected serially in a holding circuit from the input circuit which includes the normally open switch to permit operation of the one winding only when the punch controlled switch is closed and operation of the other winding so long as the electrical signal continues in the input circuit.

References Cited in the file of this patent
UNITED STATES PATENTS

| | | |
|---|---|---|
| 1,315,201 | Bauer | Sept. 9, 1919 |
| 1,699,782 | Erickson | Jan. 22, 1929 |
| 1,823,944 | Kittredge et al. | Sept. 22, 1931 |
| 2,908,848 | Hull | Oct. 13, 1959 |